United States Patent
Okinoshima et al.

(10) Patent No.: US 6,312,553 B1
(45) Date of Patent: Nov. 6, 2001

(54) ADHESIVE SILICONE ELASTOMER FILM, AND COVERING METHOD AND BONDING METHOD MAKING USE OF THE SAME

(75) Inventors: Hiroshige Okinoshima; Tsutomu Kashiwagi, both of Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/466,887

(22) Filed: Dec. 20, 1999

(30) Foreign Application Priority Data

Dec. 18, 1998 (JP) .................................................. 10-360938

(51) Int. Cl.$^7$ ..................................................... C08F 30/08
(52) U.S. Cl. .............................. 156/329; 522/53; 522/64; 522/65; 522/99; 528/32; 528/34; 427/387
(58) Field of Search ........................... 528/32, 34; 522/53, 522/64, 68, 99; 427/387; 156/329

(56) References Cited

U.S. PATENT DOCUMENTS 6,069,186 * 5/2000 Okinoshima et al. .................. 522/42

FOREIGN PATENT DOCUMENTS 11-302348   11/1999   (JP) .

* cited by examiner

*Primary Examiner*—Margaret G. Moore
(74) *Attorney, Agent, or Firm*—Pillsbury Winthrop LLP

(57) ABSTRACT

An adhesive silicone elastomer film obtained by forming a radiation-curable silicone rubber composition into a film and curing the resulting film by radiation; the composition including (A) an oily organopolysiloxane, (B) a radiation sensitizer and (C) an alkoxysilane and/or a partial hydrolysis-condensation product thereof. The oily organopolysiloxane includes, e.g., a compound represented by the formula:

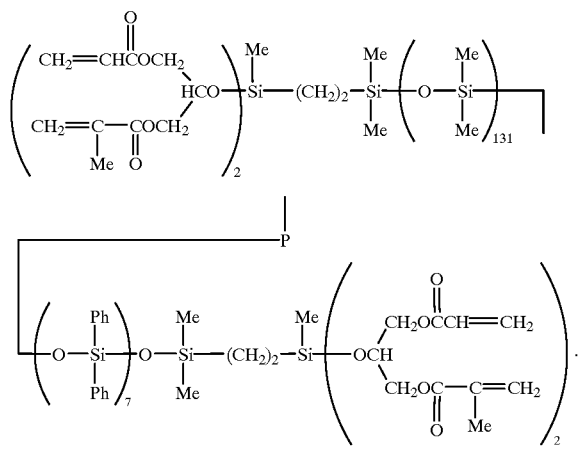

This film can be produced in a short time as clean films easy to handle and having a uniform shape, can rationalize work steps when used, and also has a low elasticity and sufficient heat resistance, adhesiveness and workability. This film is useful in the covering or bonding of articles.

10 Claims, No Drawings

ADHESIVE SILICONE ELASTOMER FILM, AND COVERING METHOD AND BONDING METHOD MAKING USE OF THE SAME

BACKGROUND OF THE INVENTION

1. Field of the Invention

This invention relates to an adhesive silicone elastomer film useful as an adhesive film for electronic parts, and a covering method and a bonding method which make use of the same.

2. Description of the Prior Art

Epoxy types of adhesive films are conventionally used for the die bonding of semiconductor devices or for TAB (tape automated bonding) tapes. However, these adhesive films have problems that they have an insufficient heat resistance and they can not be made low-elastic (a high-elastic one makes it difficult to relax thermal and mechanical stress when used, e.g., as an adhesive layer by putting it between two substrates of different types, resulting in products with low reliability).

On the other hand, silicone films generally have remarkable heat resistance and low elasticity. But silicone adhesive films having sufficient adhesiveness and workability, which are produced with ease, are not known.

SUMMARY OF THE INVENTION

An object of the present invention is to provide an adhesive silicone elastomer film that can be produced in a short time as clean films easy to handle and having a uniform shape, can rationalize work steps when used, and also has a low elasticity and sufficient heat resistance, adhesiveness and workability, and a covering method and a bonding method which make use of such a film.

To achieve the above object, the present invention provides an adhesive silicone elastomer film obtained by forming a radiation-curable silicone rubber composition into a film and curing the resulting film by radiation; the composition comprising;

(A) an organopolysiloxane represented by the general formula (I):

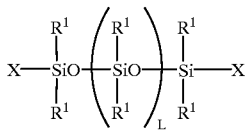

(I)

wherein $R^1$'s may be the same or different and are each a substituted or unsubstituted monovalent hydrocarbon group having 1 to 9 carbon atoms; X is a group represented by the general formula (II):

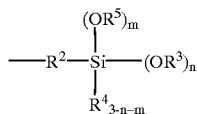

(II)

wherein $R^2$ is a divalent hydrocarbon group having 2 to 4 carbon atoms, or an oxygen atom; $R^3$ is a monovalent organic group having 4 to 25 carbon atoms, having 1 to 3 (meth)acryloyl groups; $R^4$ is a substituted or unsubstituted monovalent hydrocarbon group having 1 to 9 carbon atoms; $R^5$ is a monovalent hydrocarbon group having 1 to 18 carbon atoms; n is an integer of 1 to 3, m is an integer of 0 to 2, and n and m satisfy $1 \leq n+m \leq 3$, provided that when n=1 the group represented by $R^3$ has a plurality of (meth)acryloyl groups, and when the groups $R^4$ and $R^5$ are each two or more in the molecule, $R^4$'s and $R^5$'s may each be the same or different; and L is an integer of 8 to 10,000;

(B) a radiation sensitizer; and (C) a compound selected from the group consisting of an alkoxysilane represented by the general formula (III):

$Si(OR^6)_4$      (III)

wherein $R^6$ is a substituted or unsubstituted lower alkyl group; and a partial hydrolysis-condensation product thereof.

The present invention also provides a covering method comprising covering a substrate with the above adhesive silicone elastomer film partly or completely, followed by heating to cause the film to cure.

The present invention still also provides a bonding method comprising inserting the above adhesive silicone elastomer film between two articles or two parts of an article, followed by heating to cause the film to cure, to bond the both articles or the both parts stated above.

DETAILED DESCRIPTION OF THE PREFERRED EMBODIMENTS

The present invention will be described below in detail.

In the present specification, the terms (meth)acryloyl, (meth)acryloyloxyl and (meth)acrylate are meant to embrace acryloyl and methacryloyl, acryloyloxyl and methacryloyloxyl, and acrylate and methacrylate, respectively.

Adhesive Silicone Elastomer Film

The adhesive silicone elastomer film is formed using a radiation-curable silicone rubber composition containing the following components (A) to (C). Incidentally, the adhesive silicone elastomer film referred to in the present invention may embrace a sheet.

(A) Organopolysiloxane:

The component-(A) organopolysiloxane is a component used as a base polymer, and is represented by the above general formula (I).

In the general formula (I), $R^1$'s may be the same or different and are each a substituted or unsubstituted monovalent hydrocarbon group having 1 to 9 carbon atoms, and preferably 1 to 6 carbon atoms. As specific examples of this monovalent hydrocarbon group, it may include alkyl groups such as a methyl group, an ethyl group, a propyl group, an isopropyl group, a butyl group, an isobutyl group, a tert-butyl group, a pentyl group, a hexyl group, a heptyl group, a 2-ethylhexyl group, an octyl group and a nonyl group; cycloalkyl groups such as a cyclohexyl group and a cycloheptyl group; alkenyl groups such as a vinyl group, an allyl group, a propenyl group, an isopropenyl group, a butenyl group and a hexenyl group; aryl groups such as a phenyl group and a tolyl group; aralkyl groups such as a benzyl group, a phenylethyl group and a phenylpropyl group; and corresponding substituted hydrocarbon groups formed by substitution of at least part of hydrogen atoms bonded to the carbon atom of the hydrocarbon groups exemplified above substituted with a substituent such as a halogen atom or a cyano group, as exemplified by a chloromethyl group, a cyanoethyl group and a trifluoropropyl group. Preferred are those in which 50 mole % or more of $R^1$'s is occupied by methyl groups, and 25 mole % or less by phenyl groups.

In the general formula (I), X is a group represented by the above general formula (II). $R^2$ in the general formula (II) is a divalent hydrocarbon group having 2 to 4 carbon atoms, or an oxygen atom. In view of water resistance, it may preferably, be the divalent hydrocarbon group. As specific examples of this divalent hydrocarbon group, it may include alkylene groups having 2to 4carbon atoms, such as an ethylene group, a propylene, group, a methylethylene group and a tetramethylene group. The ethylene group is preferred.

$R^3$ in the general formula (II) is a monovalent organic group having 4 to 25 carbon atoms, having 1 to 3, preferably 2 or 3, and more preferably 3, (meth)acryloyl groups (in particular, as (meth)acryloyloxyl groups). As specific examples of the (meth)acryloyl group or (meth)acryloyloxyl group represented by $R^3$, it may include acrylic functional groups and methacrylic functional groups such as $CH_2=CHCOO-$, $CH_2=C(CH_3)COO-$, $CH_2=CHCO-$ and $CH_2=C(CH_3)CO-$. As specific examples of the monovalent organic group containing such a (meth)acryloyl group, it may include alkyl groups having 1 to 10 carbon atoms, and preferably 2 to 6 carbon atoms, substituted with 1 to 3 acryloyloxyl groups or methacryloyloxyl groups, such as $CH_2=CHCOOCH_2CH_2-$, $[CH_2=C(CH_3)COOCH_2]_3C-CH_2-$, $(CH_2=CHCOOCH_2)_3C-CH_2-$ and $(CH_2=CHCOOCH_2)_2C(C_2H_5)CH_2-$. Preferred are $CH_2=CHCOOCH_2CH_2-$, $[CH_2=C(CH_3)COOCH_2]_3C-CH_2-$, $(CH_2=CHCOOCH_2)_3C-CH_2-$, $(CH_2=CHCOOCH_2)_2C(C_2H_5)CH_2-$, $CH_2=C(CH_3)COOCH_2CH_2-$, $[CH_2=C(CH_3)COOCH_2]_2C(C_2H_5)-CH_2-$ and $(CH_2=CHCOOCH_2)[CH_2=C(CH_3)COOCH_2]CH-$. More preferred are $[CH_2=C(CH_3)COOCH_2]_3C-CH_2-$, $(CH_2=CHCOOCH_2)_3C-CH_2-$, $(CH_2=CHCOOCH_2)_2C(C_2H_5)CH_2-$ and $(CH_2=CHCOOCH_2)[CH_2=C(CH_3)COOCH_2]CH-$.

$R^4$ in the general formula (II) may be the same or different when present in plurality, and is a substituted or unsubstituted monovalent hydrocarbon group having 1 to 9 carbon atoms, and preferably 1 to 6 carbon atoms. As specific examples of the group represented by $R^4$, it may include the same one as those exemplified for $R^1$ in the general formula (I). Like the case of $R^1$, preferred are those in which 50 mole % or more of $R^4$'s is occupied by methyl groups, and 25 mole % or less by phenyl groups.

$R^5$ in the general formula (II) is a monovalent hydrocarbon group having 1 to 18 carbon atoms, and preferably 1 to 8 carbon atoms. As specific examples of the monovalent hydrocarbon group represented by $R^5$, it may include alkyl groups such as a methyl group, an ethyl group, a propyl group, a butyl group, a pentyl group and a neopentyl group; cycloalkyl groups such as a cyclohexyl group; aryl groups such as a phenyl group; and alkenyl groups such as an allyl group, a propenyl group and a butenyl group. Preferably usable are those excluding aliphatic unsaturated groups such as alkenyl groups.

In the general formula (II), n is an integer of 1 to 3, m is an integer of 0 to 2, and n and m satisfy $1 \leq n+m \leq 3$, provided that when n=1 the group represented by $R^3$ has a plurality of (i.e., 2 or 3) (meth)acryloyl groups.

In the general formula (I), L is an integer of 8 to 10,000, and preferably 48 to 1,000.

The monovalent hydrocarbon group represented by the general formula (I) can be exemplified by the following.

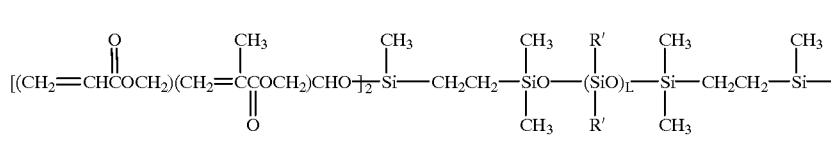

(1-1)

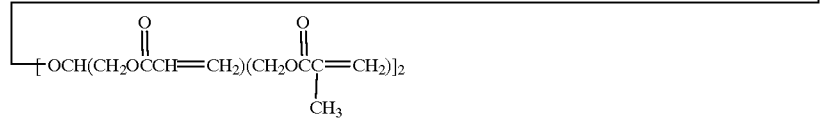

(1-2)

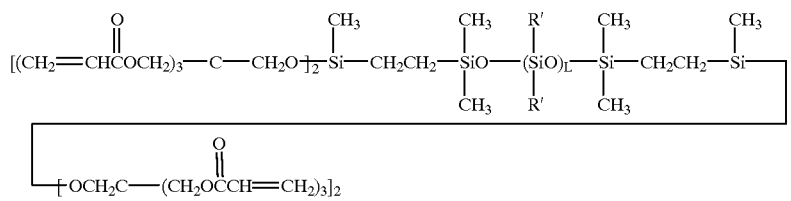

(1-3)

(1-4)
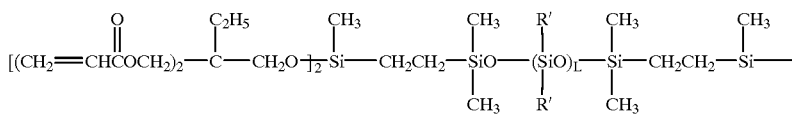
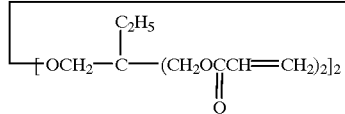
(1-5)
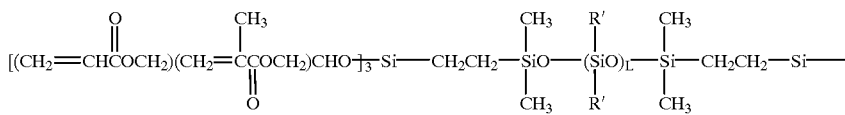
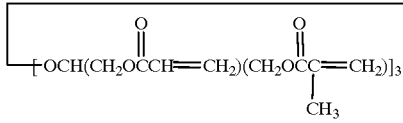
(1-6)
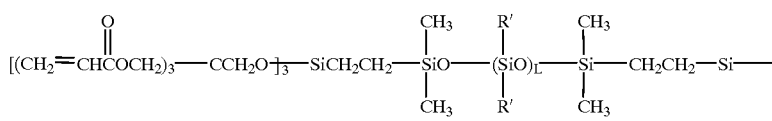
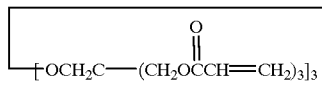
(1-7)
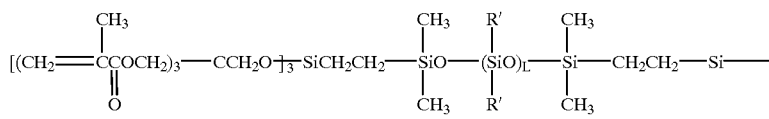
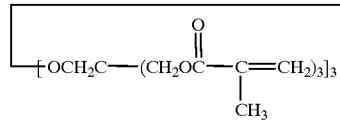
(1-8)
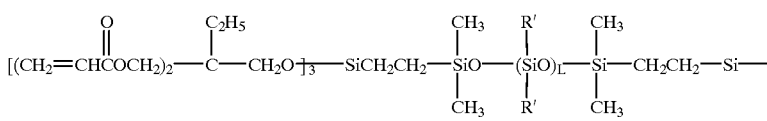
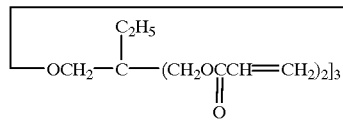
(1-9)
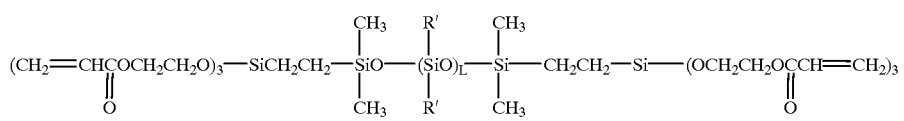
(1-10)
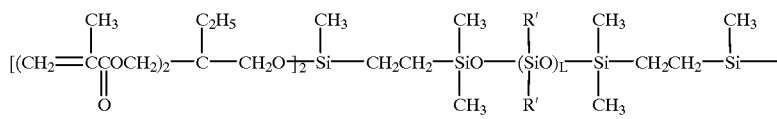
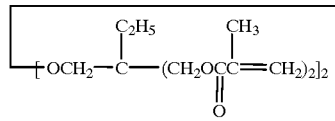

-continued
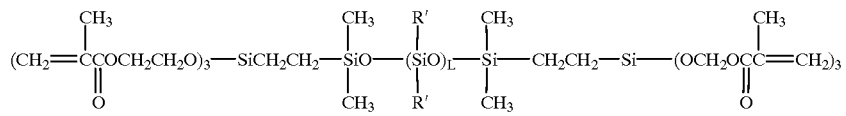
(1-11)
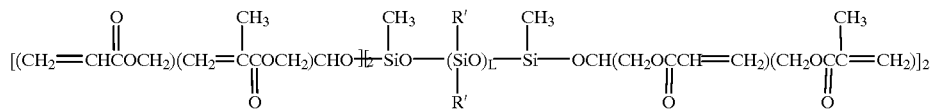
(1-12)
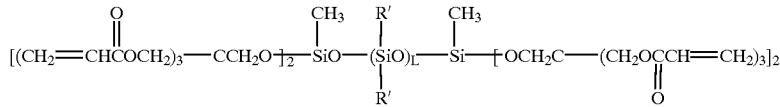
(1-13)
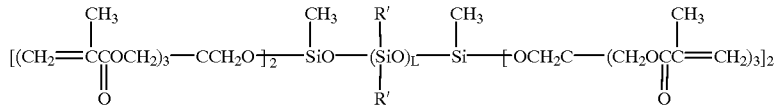
(1-14)
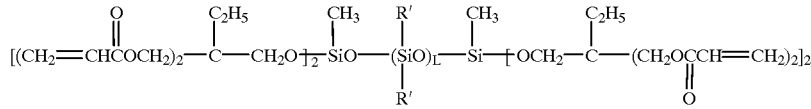
(1-15)
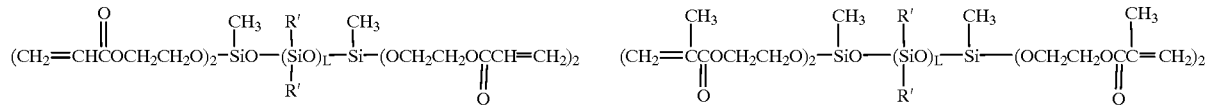
(1-16) (1-17)
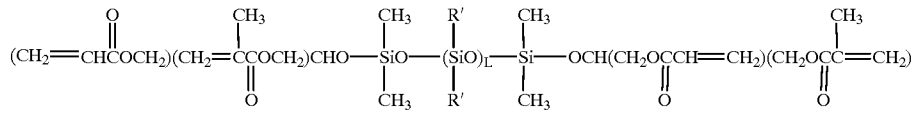
(1-18)
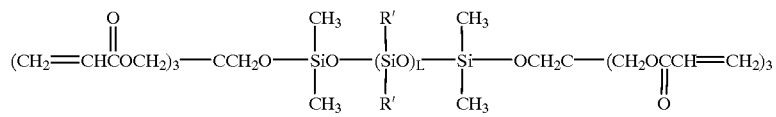
(1-19)
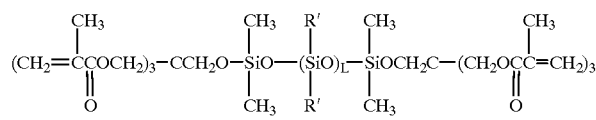
(1-20)
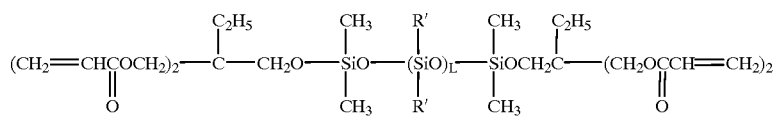
(1-21)
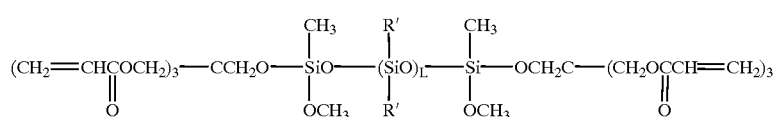
(1-22)
(1-23)

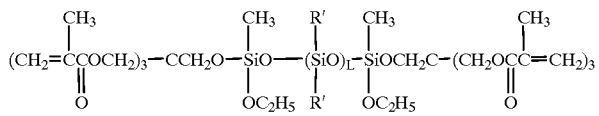

In the above formulas (1-1) to (1-23), R' represents a methyl group, a phenyl group or a 3,3,3-trifluoropropyl group, and L represents an integer of 8 to 10,000, and preferably 48 to 1,000.

The component-(A) organopolysiloxane has —$OR^3$ groups [more specifically, has a plurality of (i.e., 2 to 9) (meth)acryloyl groups at each terminal of the molecular chain] as radiation-sensitive groups, and hence has a feature that it is readily curable upon exposure to radiations such as ultraviolet rays. This organopolysiloxane may be used alone or in combination of two or more.

The organopolysiloxane represented by the general formula (I) can be produced by dehydrochlorination reaction of the corresponding chlorosiloxane with a (meth)acryloyl functional compound having active hydroxyl groups. Here, the chlorosiloxane is exemplified by those represented by the following formulas.

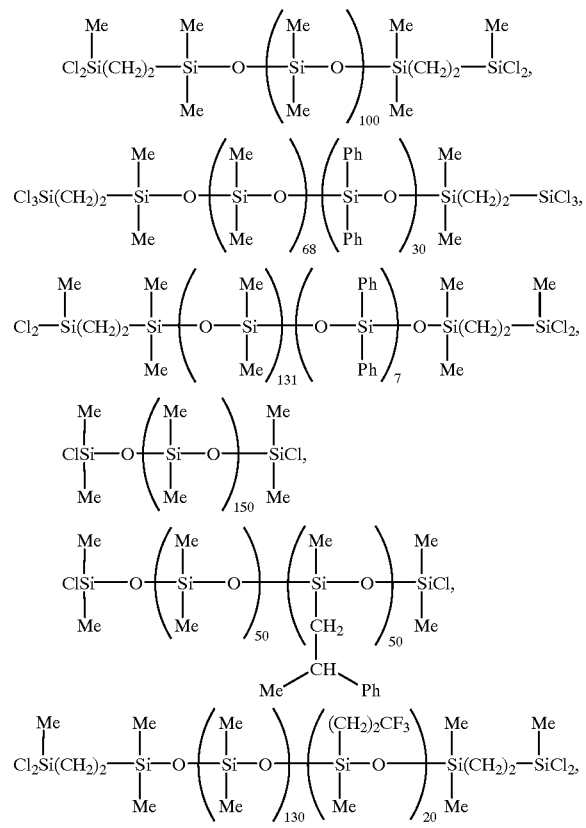

In the above formulas, Me is a methyl group and Ph is a phenyl group.

The (meth)acryloyl functional compound having active hydroxyl groups is exemplified by 2-hydroxyethyl (meth) acrylate, methylolpropane di(meth)acrylate, pentaerythritol tri(meth)acrylate and 2-hydroxy-1-acryloxy-3-methacryloxypropane. Since it is preferable for the intended organopolysiloxane to have a plurality of (2 to 9) (meth) acryloyl groups for one silicon atom, methylolpropane di(meth)acrylate, pentaerythritol tri(meth)acrylate and 2-hydroxy-1-acryloxy-3-methacryloxypropane are preferred. Pentaerythritol tri(meth)acrylate is more preferred.

(B) Radiation sensitizer:

The component-(B) radiation sensitizer is preferably exemplified by, but not particularly limited to, benzoyl compounds (or phenyl ketone compounds), and preferably benzoyl compounds (or phenyl ketone compounds) having a hydroxyl group on the carbon atom at the α-position of the carbonyl group, such as benzophenone, 1-hydroxycyclohexyl-phenyl ketone, 2-hydroxy-2-methyl-1-phenylpropan-1-one and 1-(4-isopropylphenyl)-2-hydroxy-2-methylpropan-1-one; organophosphine oxide compounds such as 2,4,6-trimethylbenzoyldiphenylphosphine oxide, bisacylmonoorganophosphine oxides and bis(2,6-dimethoxybenzoyl)-2,4,4-trimethylpentylphosphine oxide; benzoin ether compounds such as isobutylbenzoin ether; ketal compounds such as acetophenone diethylketal; thioxanthone compounds; and acetophenone compounds. Any of these may be used alone or in combination of two or more.

The component (B) may usually be mixed in an amount of from 0.5 to 10 parts by weight, and preferably from 1.0 to 5.0 parts by weight, based on 100 parts by weight of the component (A).

(C) Alkoxysilane and/or partial hydrolysis-condensation product thereof:

The component-(C) alkoxysilane is represented by the above general formula (III), and is a component that imparts as an adhesive auxiliary a good adhesiveness to substrates of various types.

In the general formula (III), $R^6$ is a lower alkyl group or an alkoxyl-substituted lower alkyl group which have about 1 to 6 carbon atoms, preferably having 1 to 4 carbon atoms or an alkyl group having 1 to 3 carbon atoms and substituted with an alkoxy group having 1 to 3 carbon atoms. As specific examples of this lower alkyl group, it may include a methyl group, an ethyl group, a propyl group, an isopropyl group, a butyl group, an isobutyl group and a tert-butyl group. The alkoxyl-substituted lower alkyl group may include a methoxymethyl group, a methoxyethyl group, an ethoxymethyl group and an ethoxyethyl group.

The partial hydrolysis-condensation product of the alkoxysilane is meant to be a siloxane compound in which at least one, and preferably two or more, alkoxyl group(s) remain(s) in the molecule (in particular, a siloxane oligomer having approximately 2 to 100, and preferably 2 to 30, silicon atoms), formed by partial hydrolysis-condensatlon reaction of the alkoxyl group.

Both the alkoxysilane represented by the general formula (III) and the partial hydrolysis-condensation product thereof may each be used alone or in combination of two or more types. A mixture of the alkoxysilane represented by the general formula (III) and the partial hydrolysis-condensation product thereof may also be used.

Like the case of the component (B), the component (C) may usually be mixed in an amount of from 0.5 to 10 parts by weight, and preferably from 1.0 to 5.0 parts by weight, based on 100 parts by weight of the component (A).

Other optional components:

The radiation-curable silicone rubber composition used in the present invention may optionally be compounded with various additives in order to appropriately control the shrinkage at the time of curing, the coefficient of thermal expansion, mechanical strength, heat resistance, chemical resistance, flame retardance and gas permeability of cured products to be obtained. Such additives may include, e.g., fumed silica, precipitated silica, molten silica, ground silica, crystalline silica, silica aerogel, quartz powder, glass fiber, iron oxide, titanium oxide, calcium carbonate and magnesium carbonate; polymerization inhibitors (pot-life extenders) such as hydroquinone and methoxyhydroquinone.

In order to bring out adhesiveness to various substrates more rapidly, the composition may also be compounded with an organic titanium compound such as a titanate (titanic acid ester) or a titanium chelate compound.

Preparation of composition:

The radiation-curable silicone rubber composition used in the present invention is prepared by mixing the above components (A) to (c) and optionally other additives. The radiation-curable silicone rubber composition thus obtained has characteristic features that it can be formed into low-viscous (liquid) products and also into pastes or compounded products, can be worked into molded products such as films, can be cured in short time by radiations such as ultraviolet rays, and can provide silicone elastomer molded products (cured products) having adhesiveness.

Production of adhesive silicone elastomer film:

The adhesive silicone elastomer film is produced in the following way: When the radiation-curable silicone rubber composition thus obtained is low viscous, it is molded into films or sheets by, e.g., casting it into a film- or sheet-shaped mold. When the silicone rubber composition is high viscous or in the form of a compounded product, it is molded into films or sheets by means of a calender roll or injection molding machine. Then, the film-shaped molded products obtained are exposed to radiations such as ultraviolet rays for a short time. In the present invention the composition is molded into films or sheets, but the composition itself may be molded into any other shapes.

The adhesive silicone elastomer film of the present invention, thus obtained, may usually have a thickness selected within the range of from 0.01 to 2.00 mm as occasion calls.

The radiations may include ultraviolet rays, far infrared, rays, electron rays, X-rays and γ-rays. In view of the simplicity and readiness-to-handle of apparatus, it is preferred to use ultraviolet rays. A light source for emitting the ultraviolet rays may include, e.g., high-pressure mercury lamps, ultrahigh-pressure mercury lamps, metal halide lamps, carbon arc lamps and xenon lamps. The dose of radiations may differ depending on the thickness of the composition. For example, when the composition is in a thickness of 2 mm, radiations (peak: 320 to 390 nm) may be in a dose of from 200 to 2,400 mJ/cm², and preferably from 400 to 1,600 mJ/cm².

Uses:

The adhesive silicone elastomer film of the present invention is useful as covering materials of various electronic parts, adhesives and so forth, in particular, as adhesives, e.g., as die bonding materials of semiconductor devices.

Silicone Elastomer Covering Method and Bonding Method

In the covering method of the present invention, a silicone elastomer covered article is produced by covering a substrate partly or completely with the adhesive silicone elastomer film obtained as described above, followed by heating to cause the film to cure.

In the bonding method of the present invention, a structure is produced by inserting the adhesive silicone elastomer film between two articles or two parts of an article, followed by heating to cause the film to cure usually under pressure between the both articles or the both parts stated above, to bond the the both articles or the both parts to each other. Since the silicone elastomer film has an adhesiveness, it acts effectively as a cover of the above covered article or as an adhesive layer of the above structure. To describe the method by taking the case of die bonding as an example, the adhesive silicone elastomer film of the present invention is so disposed as to be inserted between a die and a predetermined area of a support (e.g., a lead frame or a package) to which the die is to be mounted, and the film is heated and cured between the die and the support. Thus, the die bonding is completed.

The material of the substrate used in the production of these covered article and structure may be exemplified by, but not particularly limited to, silicon, glass, aluminum, polycarbonate, polylmide and glass epoxy substrates. The heating may usually be carried out at a temperature of from 60 to 200° C., and preferably from 100 to 180° C., and for a time of from 1 minute to 2 hours.

EXAMPLES

The present invention will be described below by giving Examples. In the following examples, part(s) refers to part(s) by weight. In the formulas, Me represents a methyl group, Ph a phenyl group, and Et an ethyl group.

Example 1

Into a 1,000 ml reactor fitted with a stirrer, a reflux condenser, a dropping funnel and a dry-air feeder, 571 g of a chloroorganopolysiloxane represented by the following average formula:

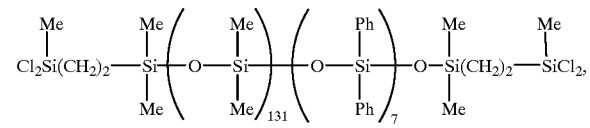

47 g of 2-hydroxy-1-acryloxy-3-methacryloxypropane (trade name: NK ESTER 701-A, available from Shin-Nakamura Chemical Co., Ltd.), 200 ml of toluene, 26 g of triethylamine and 2,000 ppm of dibutylhydroxytoluene as a polymerization inhibitor were put, and temperature was raised to 70° C. to carry out heating and reaction for 7 hours with stirring. The reaction solution was left to cool and thereafter filtered, and 4 g of propylene oxide was added, followed by stirring at room temperature for 1 hour and then stripping at 100° C./30 mmHg to obtain a transparent oily organopolysiloxane represented by the following formula.

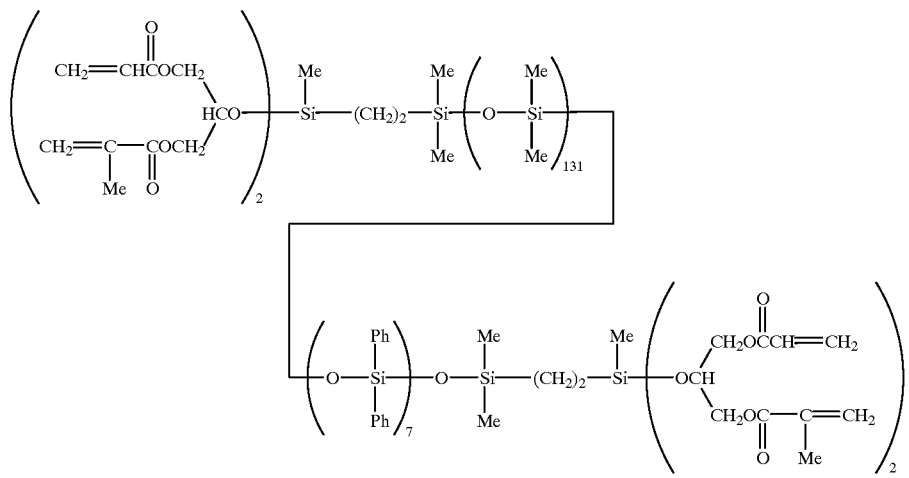

Next, in 100 parts of this organopolysiloxane, 2 parts of 2-hydroxy-2-methyl-1-phenylpropan-1-one, 1 part of 2,4,6-trimethylbenzoyldiphenylphosphine oxide and 3 parts of tetramethoxysilane were mixed to obtain a radiation-curable silicone rubber composition.

This composition was casted into a nickel-coated mold (100 mm long×100 mm wide and 1 mm deep), and exposed to ultraviolet rays (dose: 800 mJ/cm$^2$) for 2 seconds in a conveyor furnace having two metal halide mercury lamps of 80 W/cm$^2$, to cause the film to cure by radiation. Hardness of the adhesive silicone elastomer film thus obtained was measured according to JIS K6301. The hardness was measured with a spring A-type tester.

Results obtained are shown in Table 1.

Next, the adhesive silicone elastomer film was cut in a size of 25 mm long×10 mm wide, and was inserted between two test pieces as supporting materials (substrates), each made of aluminum, silicon (silicon wafers), polyimide (polyimide films), glass or polycarbonate. This was contact-bonded at 100 gf/cm$^2$, and heated at 150° C. for 60 minutes to cure, thus structures were produced. Their adhesive force (bond strength) was measured.

Results obtained are shown in Table 2.

Example 2

A composition was prepared in the same manner as in Example 1 except that the tetramethoxysilane was replaced with a partial hydrolysis-condensation product of tetramethoxysilane (a methoxysiloxane oligomer) represented by the following formula:

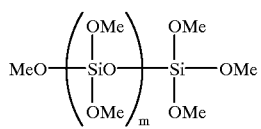

wherein m is an integer of 1 to 7.

Using this composition, an adhesive silicone elastomer film and structures were produced similarly, and were tested in the same manner as in Example 1.

Results obtained are shown in Tables 1 and 2.

Example 3

A composition was prepared in the same manner as in Example 1 except that the tetramethoxysilane was replaced with a partial hydrolysis-condensation product of tetramethoxysilane (an ethoxysiloxane oligomer) represented by the following formula:

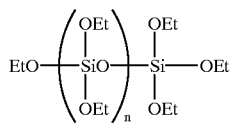

wherein n is an integer of 1 to 7.

Using this composition, an adhesive silicone elastomer film and structures were produced similarly, and were tested in the same manner as in Example 1.

Results obtained are shown in Tables 1 and 2.

Comparataive Example 1

A composition was prepared in the same manner as in Example 1 except that the tetramethoxysilane was not added. Using this composition, an adhesive silicone elastomer film and structures were produced similarly, and were tested in the same manner as in Example 1.

Results obtained are shown in Tables 1 and 2.

Comparative Example 2

A composition was prepared in the same manner as in Example 1 except that the tetramethoxysilane was replaced with acryloxypropyltrimethoxysilane. Using this composition, an adhesive silicone elastomer film and structures were produced similarly, and were tested in the same manner as in Example 1.

Results obtained are shown in Tables 1 and 2.

Comparative Example 3

A composition was prepared in the same manner as in Example 1 except that the tetramethoxysilane was replaced with a partial hydrolysis-condensation product of methyltrimethoxysilane (a methyl-group-containing methoxysiloxane oligomer) represented by the following formula:

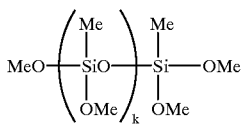

wherein k is an integer of 1 to 7.

Using this composition, an adhesive silicone elastomer film and structures were produced similarly, and were tested in the same manner as in Example 1.

Results obtained are shown in Tables 1 and 2.

TABLE 1

|  | Example 1 | Example 2 | Example 3 | Comparative Example 1 | Comparative Example 2 | Comparative Example 3 |
|---|---|---|---|---|---|---|
| Hardness after exposure at 800 Mj | 51 | 50 | 49 | 51 | 51 | 50 |

(Remarks) Measured with a spring A-type tester prescribed in JIS K6301

TABLE 2

|  | | Example | | | Comparative Example | |
|---|---|---|---|---|---|---|
| Substrate | 1 | 2 | 3 | 1 | 2 | 3 |
| 150° C./ 60 minutes  Silicon wafer | 5.0 | 4.9 | 4.8 | 0 | 0.2 | 0.2 |
| Aluminum | 4.5 | 4.6 | 4.8 | 0 | 0 | 0 |
| Glass | 4.8 | 4.9 | 4.9 | 0 | 0.2 | 0.2 |
| Polyimide film | 4.8 | 4.6 | 4.8 | 0 | 0 | 0 |
| Polycarbonate | 4.9 | 4.6 | 4.8 | 0 | 0 | 0 |

(Remarks) Unit: kg/cm$^2$

As described above, the adhesive silicone elastomer film of the present invention has the following advantages.

(1) Since it can be obtained by radiation curing in a short time, the production time can be shortened, and also films can be obtained in a uniform shape. Hence, The bonded products can have a stable quality, and also can be obtained as clean films.
(2) Since it has a good workability, adhesive layers with fixed size can be formed by cutting.
(3) Since it has a low elasticity, the thermal and mechanical stress can be relaxed when two different substrates are bonded, and the bonded products can be improved in reliability.
(4) Since it is a cured product, it can be handled with ease.
(5) Since it is supplied as a film-shaped molded product, work steps when used (production steps of bonded products) can be rationalized.

What is claimed is:

1. An adhesive silicone elastomer film obtained by forming a radiation-curable silicone rubber composition into a film having a thickness of from 0.01 to less than 2.0 mm and curing the resulting film by radiation; said composition comprising:

(A) an organopolysiloxane represented by the general formula (I):

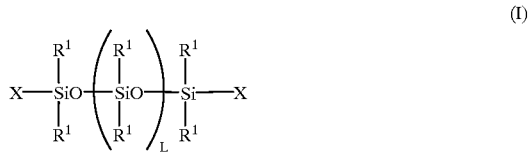

wherein $R^1$'s are the same or different and are each a substituted or unsubstituted monovalent hydrocarbon group having 1 to 9 carbon atoms; X is a group represented by the general formula (II):

wherein $R^2$ is a divalent hydrocarbon group having 2 to 4 carbon atoms, or an oxygen atom; $R^3$ is a monovalent organic group having 4 to 25 carbon atoms, having 1 to 3 (meth)acryloyl groups; $R^4$ is a substituted or unsubstituted monovalent hydrocarbon group having 1 to 9 carbon atoms; $R^5$ is a monovalent hydrocarbon group having 1 to 18 carbon atoms; n is an integer of 1 to 3, m is an integer of 0 to 2, and n and m satisfy $1 \leq n+m \leq 3$, provided that when n=1 the group represented by $R^3$ has a plurality of (meth)acryloyl groups, but when the number of each of the groups $R^4$ and $R^5$ is two or more in the molecule, $R^4$'s and $R^5$'s may each be the same or different; and L is an integer of 8 to 10,000;
(B) a radiation sensitizer; and
(C) a compound selected from the group consisting of an alkoxysilane represented by the general formula (III):

$$Si(OR^6)_4 \quad (III)$$

wherein $R^6$ is a substituted or unsubstituted lower alkyl group; and a partial hydrolysis-condensation product thereof.

2. The film of claim 1, wherein, in the general formula (I), $R^1$'s are the same or different and are each an alkyl group, cycloalkyl group, alkenyl group, aryl group or aralkyl group each having 1 to 9 carbon atoms, or a corresponding substituted hydrocarbon group formed by substitution of at least part of hydrogen atoms bonded to the carbon atom of these hydrocarbons groups with a halogen atom or a cyano group; X is a group represented by the general formula (II) wherein $R^2$ is alkylene, group having 2 to 4 carbon atoms, $R^3$ is an alkyl group having 1 to 10 carbon atoms, having 2 or 3 (meth)acryloyl groups, $R^4$ is an alkyl group, cycloalkyl group, alkenyl group, aryl group or aralkyl group each having 1 to 9 carbon atoms, or a corresponding substituted hydrocarbon group formed by substitution of at least part of hydrogen atoms bonded to the carbon atom of these hydrocarbon groups with a halogen atom or a cyano group, which, when two or more are present, may be the same or different, and $R^5$ is an alkyl group, cycloalkyl group, aryl group or alkenyl group having 1 to 8 carbon atoms, which, when two or more are present, may be the same or different; and L is an integer of 48 to 10,000.

3. The film of claim 1, wherein the component-(A) organopolysiloxane is selected from the group consisting of compounds represented by the following formulas (1-1) to (1-23):

(1-23):
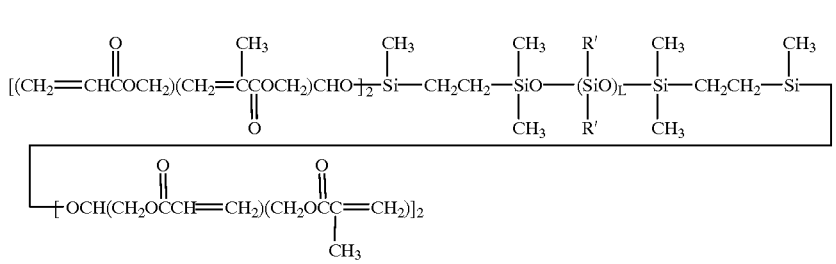
(1-1)
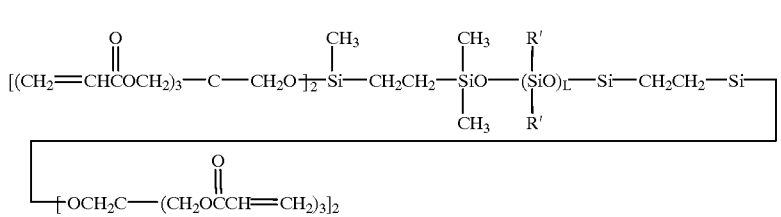
(1-2)
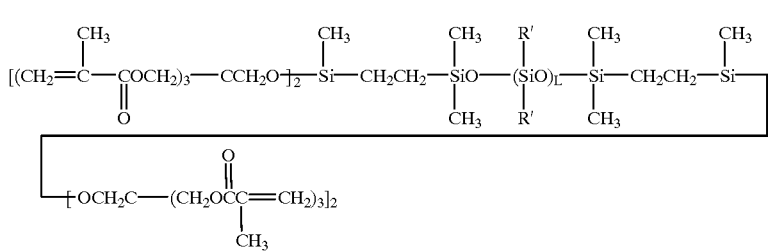
(1-3)
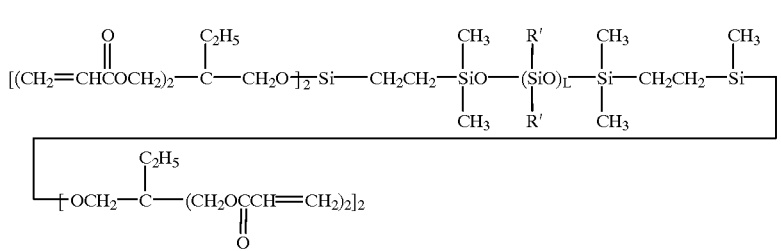
(1-4)
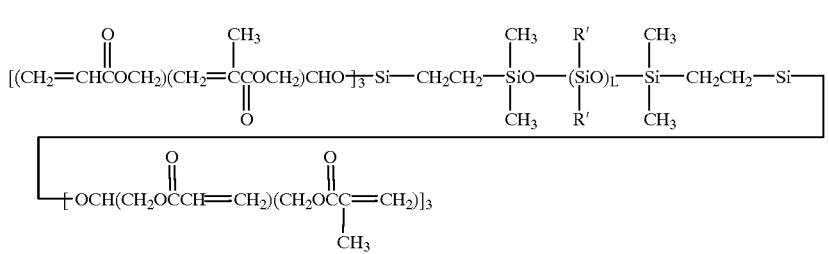
(1-5)
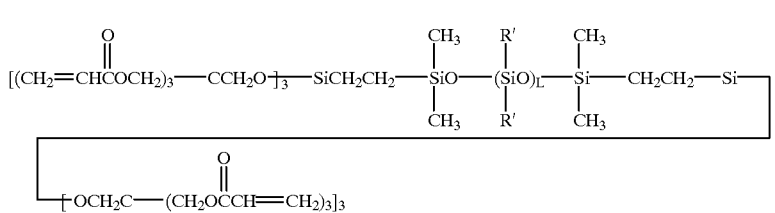
(1-6)

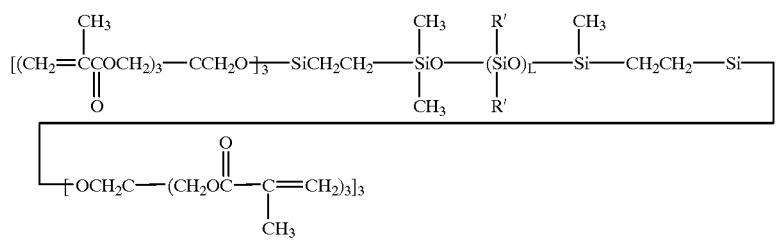
(1-7)
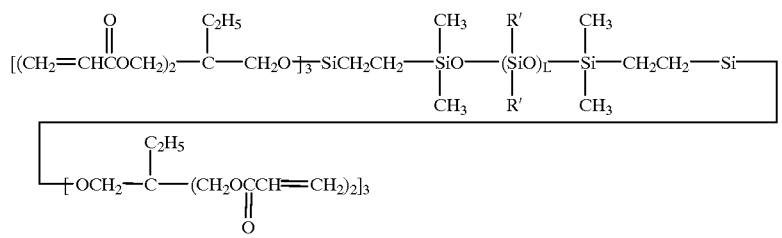
(1-8)
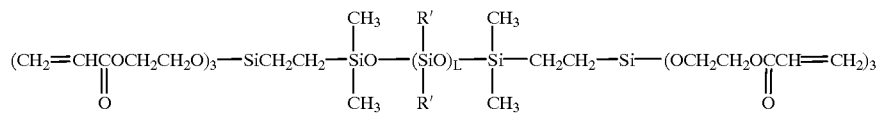
(1-9)
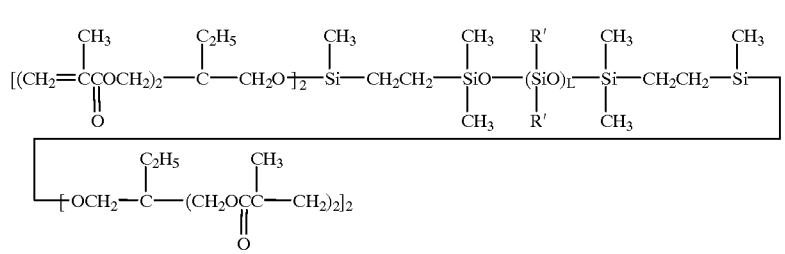
(1-10)
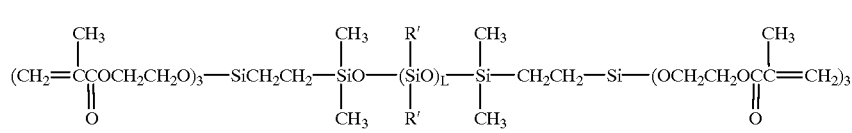
(1-11)
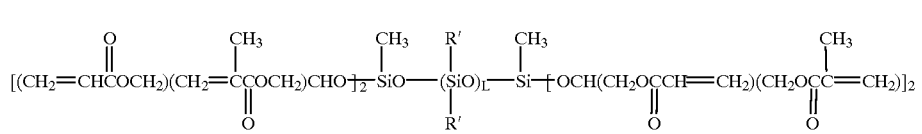
(1-12)
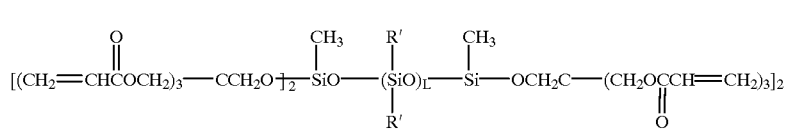
(1-13)
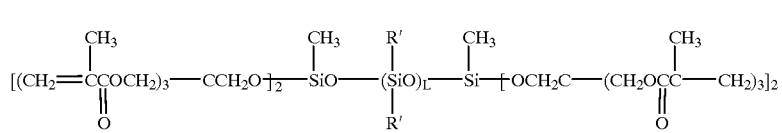
(1-14)
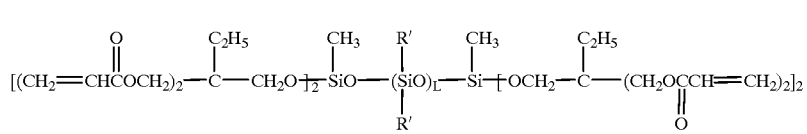
(1-15)

-continued

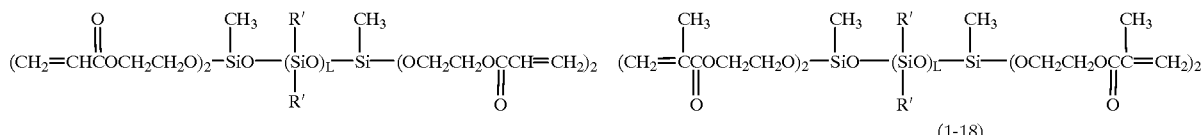

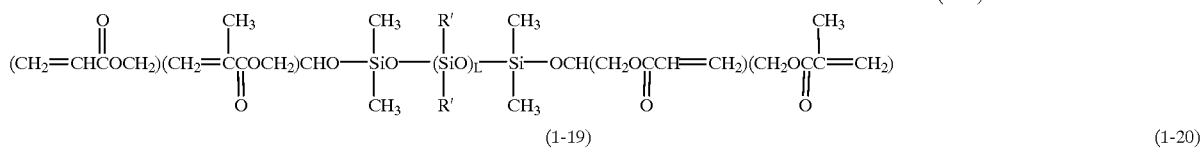

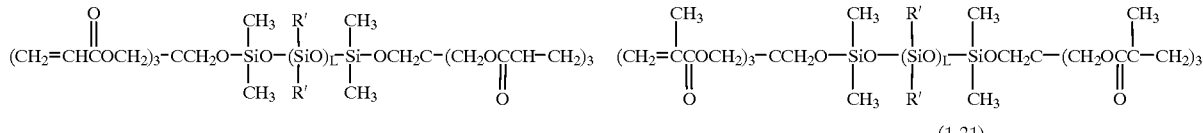

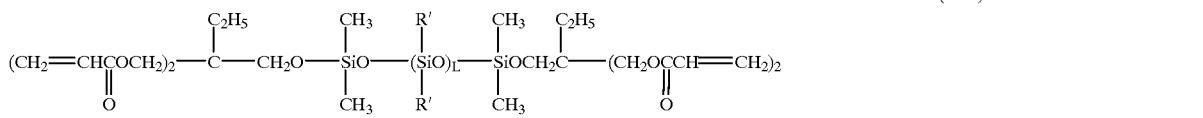

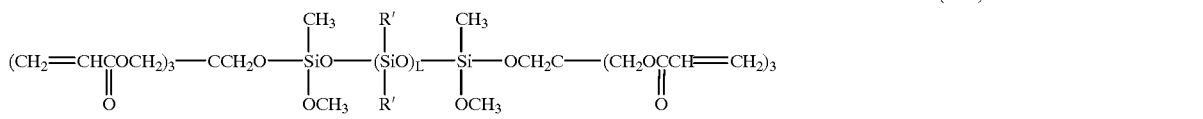

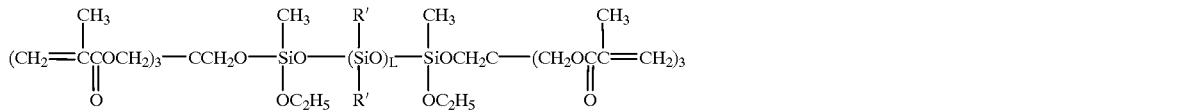

wherein R' represents a methyl group, a phenyl group or a 3,3,3-trifluoropropyl group, and L represents an integer of 8 to 10,000.

4. The film of claim 1, wherein the component-(B) radiation sensitizer is selected from the group consisting of a benzoyl compound, an organophosphine oxide compound, a benzoin ether compound, a ketal compound, a thioxanthone compound and an acetophenone compound.

5. The film of claim 1, wherein in the general formula (III), representing the component (C), $R^6$ is a lower alkyl group having 1 to 6 carbon atoms or an alkyl group having atoms and substituted with an alkoxyl group having 1 to 3 carbon atoms.

6. The film of claim 1, wherein in said radiation-curable silicone rubber composition the components (B) and (C) are present in an amount of from 0.5 part by weight to 10 parts by weight and in an amount of from 0.5 part by weight to 10 parts by weight, respectively, based on 100 parts by weight of the component (A).

7. The film of claim 1, wherein said radiation is a ultraviolet ray.

8. A covering method comprising covering partly or completely a substrate with the adhesive silicone elastomer film according to claim 1, followed by heating to cause the film to cure.

9. A bonding method comprising inserting the adhesive silicone elastomer film according to claim 1 between two parts of an article, followed by heating to cause the film to cure, to bond the both parts to each other.

10. A die bonding method comprising disposing the adhesive silicone elastomer film according to claim 1 so as to be inserted between a die and a predetermined area of a support to which the die is to be mounted, followed by heating to cause the film to cure between the die and the support.

* * * * *

UNITED STATES PATENT AND TRADEMARK OFFICE
CERTIFICATE OF CORRECTION

PATENT NO.    : 6,312,553 B1
DATED         : November 6, 2001
INVENTOR(S)   : Okinoshima et al.

It is certified that error appears in the above-identified patent and that said Letters Patent is hereby corrected as shown below:

<u>Title page,</u>
Under Item [*] Notice, please insert the following new statement :
-- This patent is subject to a terminal disclaimer. --

Signed and Sealed this

Twenty-seventh Day of August, 2002

Attest:

Attesting Officer

JAMES E. ROGAN
Director of the United States Patent and Trademark Office